United States Patent
Chen et al.

(10) Patent No.: US 8,997,242 B2
(45) Date of Patent: *Mar. 31, 2015

(54) METHODS AND APPARATUS FOR SOFTWARE LICENSE MANAGEMENT

(71) Applicant: International Business Machines Corporation, Armonk, NY (US)

(72) Inventors: Han Chen, White Plains, NY (US); Minkyong Kim, Scarsdale, NY (US); Hui Lei, Scarsdale, NY (US); Jonathan P. Munson, Putnam Valley, NY (US); Suraj Subramanian, Lafayette, LA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,104

(22) Filed: Nov. 9, 2012

(65) Prior Publication Data

US 2014/0137259 A1    May 15, 2014

(51) Int. Cl.
*G06F 21/10*        (2013.01)

(52) U.S. Cl.
CPC .................................. *G06F 21/105* (2013.01)
USPC ................... 726/26; 726/27; 726/28; 726/29; 726/30

(58) Field of Classification Search
USPC .......................................................... 726/26
See application file for complete search history.

(56) References Cited

U.S. PATENT DOCUMENTS

| | | | |
|---|---|---|---|
| 7,469,050 B2 | 12/2008 | Kouznetsov et al. | |
| 7,831,515 B2 | 11/2010 | Martinelli et al. | |
| 2001/0044705 A1* | 11/2001 | Vardi et al. ..................... | 702/186 |
| 2004/0167859 A1* | 8/2004 | Mirabella ........................ | 705/59 |
| 2004/0249756 A1* | 12/2004 | Garibay et al. .................. | 705/51 |
| 2005/0005166 A1* | 1/2005 | Kouznetsov et al. ........... | 713/201 |
| 2005/0131833 A1* | 6/2005 | Martinelli et al. .............. | 705/59 |
| 2008/0228513 A1 | 9/2008 | McMillan et al. | |
| 2008/0256531 A1* | 10/2008 | Gao et al. ....................... | 717/177 |
| 2009/0138292 A1* | 5/2009 | Dusi et al. ......................... | 705/7 |

(Continued)

OTHER PUBLICATIONS

C. Giblin et al., "From Regulatory Policies to Event Monitoring Rules: Towards Model-Driven Compliance Automation," IBM Research Report, RZ 3662, IBM Research GmbH, Zurich Research Laboratory, 8803 Rüschlikon, Switzerland, Oct. 16, 2006.

(Continued)

*Primary Examiner* — Yonas Bayou
(74) *Attorney, Agent, or Firm* — Harrington & Smith; Louis J. Percello

(57) ABSTRACT

Systems and techniques for managing software licensing are described. When a computing system service request is made, the request is intercepted and software information that may be more or less continuously updated in a managed computing environment is examined to determine the effect of the service request on software usage by the system. The software usage represented by the service request is evaluated based on licensing information to determine license usage by the system and changes in license usage based on the service request, and license usage information is determined based on the software usage and the licensing information. The license usage information may be used in connection with a system of rules to govern actions such as reporting licensing usage or allowing or preventing the use of software based on whether use of the software will violate licensing requirements.

17 Claims, 17 Drawing Sheets

(56) References Cited

U.S. PATENT DOCUMENTS

| | | | |
|---|---|---|---|
| 2009/0276269 A1* | 11/2009 | Yee et al. | 705/8 |
| 2011/0131134 A1* | 6/2011 | Ferris et al. | 705/40 |
| 2011/0131315 A1 | 6/2011 | Ferris et al. | |
| 2011/0251937 A1 | 10/2011 | Falk et al. | |
| 2011/0295986 A1* | 12/2011 | Ferris et al. | 709/222 |
| 2011/0295999 A1* | 12/2011 | Ferris et al. | 709/224 |
| 2011/0307885 A1* | 12/2011 | Cushion et al. | 718/1 |
| 2012/0041844 A1 | 2/2012 | Shen et al. | |
| 2012/0059917 A1* | 3/2012 | Dawson et al. | 709/223 |

OTHER PUBLICATIONS

G. R. Gangadharan et al., "License-Aware Service Selection," 2008 10th IEEE Conference on E-Commerce Technology and the Fifth IEEE Conference on Enterprise Computing, E-Commerce and E-Services, Date of Conference: Jul. 21-24, 2008, pp. 305-310.

Y. Raekow et al., "License Management in Grid and Cloud Computing" 2010 International Conference on P2P, Parallel, Grid, Cloud and Internet Computing (3PGCIC), Nov. 4-6, 2010, pp. 9-15.

* cited by examiner

Home : Dashboard

Detailed Product License Usage: WSRR 7.0

License type: Cores

Start Date: 2011-01-01  End Date: 2011-12-31

| Instance ID | Type | Image ID | Bundle | Provision Time | Deprovision Time | User ID |
|---|---|---|---|---|---|---|
| 42938 | 32 bit Silver | 20010008 | -- | 2011-03-10 00:00:00 | 2011-04-08 14:05:00 | joe.doe@abc.com |
| 42954 | 32 bit Silver | 20010008 | -- | 2011-03-10 00:00:00 | 2011-04-08 14:05:00 | joe.doe@abc.com |
| 50083 | 32 bit Silver | 20010008 | -- | 2011-03-10 00:00:00 | 2011-04-08 14:05:00 | joe.doe@abc.com |
| 49540 | 64 bit Copper | 20010127 | -- | 2011-03-10 00:00:00 | 2011-03-24 19:59:00 | joe.doe@abc.com |
| 24970 | 32 bit Bronze | 20010141 | -- | 2011-03-24 19:59:00 | 2011-04-08 14:05:00 | joe.doe@abc.com |
| 59447 | 64 bit Copper | 20010127 | -- | 2011-03-25 15:23:00 | 2011-04-03 18:45:00 | joe.doe@abc.com |
| 59686 | 64 bit Copper | 20010127 | -- | 2011-03-25 16:01:00 | 2011-04-08 14:05:00 | joe.doe@abc.com |
| 59688 | 32 bit Silver | 20010008 | -- | 2011-03-25 17:02:00 | 2011-03-25 16:44:00 | joe.doe@abc.com |
| 59696 | 32 bit Silver | 20010008 | -- | 2011-03-25 17:02:00 | 2011-03-25 21:18:00 | joe.doe@abc.com |
| 42938 | 32 bit Silver | 20010008 | -- | 2011-04-09 00:00:00 | 2011-05-05 14:02:00 | joe.doe@abc.com |

METHODS AND APPARATUS FOR SOFTWARE LICENSE MANAGEMENT

FIELD OF THE INVENTION

One or more embodiments of the present invention relate generally to software license management. More particularly, the invention relates to the use of data available from infrastructure management processes to track and control software licenses.

BACKGROUND

Modern large enterprises typically employ data processing resources that may be substantial and widely distributed. Such enterprises generally license software under contracts that require the organizations to monitor their own usage of the software and purchase and maintain the number of licenses needed for the number of instances of the software being used. Vendors reserve the right to audit an organization's software use and under-licensing can lead to back payments and penalties. Years ago, computing environments changed relatively slowly. A computer was purchased and software was installed on the computer, either from media purchased from a publisher or from copies made by a purchaser. A single installation was associated with a single computer and vice-versa, and an installation remained installed until removed or the computer was taken out of service.

Now, however, especially in the case of large enterprises, software installations may be in a constant state of flux. Software instances may be installed that have the capacity to accommodate many users, with the number of licenses required depending on a changing number of users. Software instances may be concentrated on servers and made accessible to users through the servers, with the number of licenses needed changing as the number of users changes. In addition, software instances may appear and disappear without changes to computing hardware or installation using an external physical medium. A particular software instance may not even be associated with an actual physical machine; instead a server may host a number of virtual machines that may appear and disappear as needed, with each installation of software on a virtual machine representing a software instance that must adhere to the license terms under which the software is provided to the enterprise. The more frequently the software environment changes, the more difficult it is for conventional techniques, such as scanning of computers for software instances, to accurately identify all instances. For example, if system scans are performed periodically, a virtual machine using a software instance may appear and disappear between scans. Numerous other difficulties attend license management in large, rapidly changing systems

SUMMARY

In one embodiment of the invention, a method comprises intercepting a computing system service request, identifying at least one software usage change needed to fulfill the computing system service request, and identifying at least one software license requirement resulting from the identified at least one software change.

In another embodiment of the invention, an apparatus comprises at least one processor and memory storing computer program code. The memory storing the computer program code is configured to, with the at least one processor, cause the apparatus to at least intercept a computing system service request, identify at least one software usage change needed to fulfill the computing system service request, and identify at least one software license requirement resulting from the identified at least one software change.

In another embodiment of the invention, a computer readable medium stores a program of instructions. Execution of the program of instructions by a processor configures an apparatus to at least intercept a computing system service request, identify at least one software usage change needed to fulfill the computing system service request, and identify at least one software license requirement resulting from the identified at least one software change.

In another embodiment of the invention, a method comprises creating a software usage event based on analysis of at least one intercepted computing system service request, wherein the software usage event is created based at least in part on stored software information updated at each computing system service request, and creating a software license usage event based on the software usage event, wherein the software license usage event is further based on stored license information and stored license rule information.

In another embodiment of the invention, an apparatus comprises at least one processor and memory storing computer program code. The memory storing the computer program code is configured to, with the at least one processor, cause the apparatus to at least create a software usage event based on analysis of at least one intercepted computing system service request, wherein the software usage event is created based at least in part on stored software information updated at each computing system service request, and create a software license usage event based on the software usage event, wherein the software license usage event is further based on stored license information and stored license rule information.

In another embodiment of the invention, a computer readable medium stores a program of instructions. Execution of the program of instructions by a processor configures an apparatus to at least create a software usage event based on analysis of at least one intercepted computing system service request, wherein the software usage event is created based at least in part on stored software information updated at each computing system service request, and create a software license usage event based on the software usage event, wherein the software license usage event is further based on stored license information and stored license rule information.

In another embodiment of the invention, a method comprises receiving a computing service request submitted to a cloud computing service, updating software inventory based on the computing service request, and updating software license usage based on the updated software inventory.

In another embodiment of the invention, an apparatus comprises at least one processor and memory storing computer program code. The memory storing the computer program code is configured to, with the at least one processor, cause the apparatus to at least receive a computing service request submitted to a cloud computing service, update software inventory based on the computing service request, and update software license usage based on the updated software inventory.

In another embodiment of the invention, a computer readable medium stores a program of instructions. Execution of the program of instructions by a processor configures an apparatus to perform at least receive a computing service request submitted to a cloud computing service, update software inventory based on the computing service request, and update software license usage based on the updated software inventory.

BRIEF DESCRIPTION OF THE SEVERAL VIEWS OF THE DRAWINGS

FIGS. 15A and 15B illustrate exemplary license usage report information according to an embodiment of the present invention;

DETAILED DESCRIPTION

Figure 1:
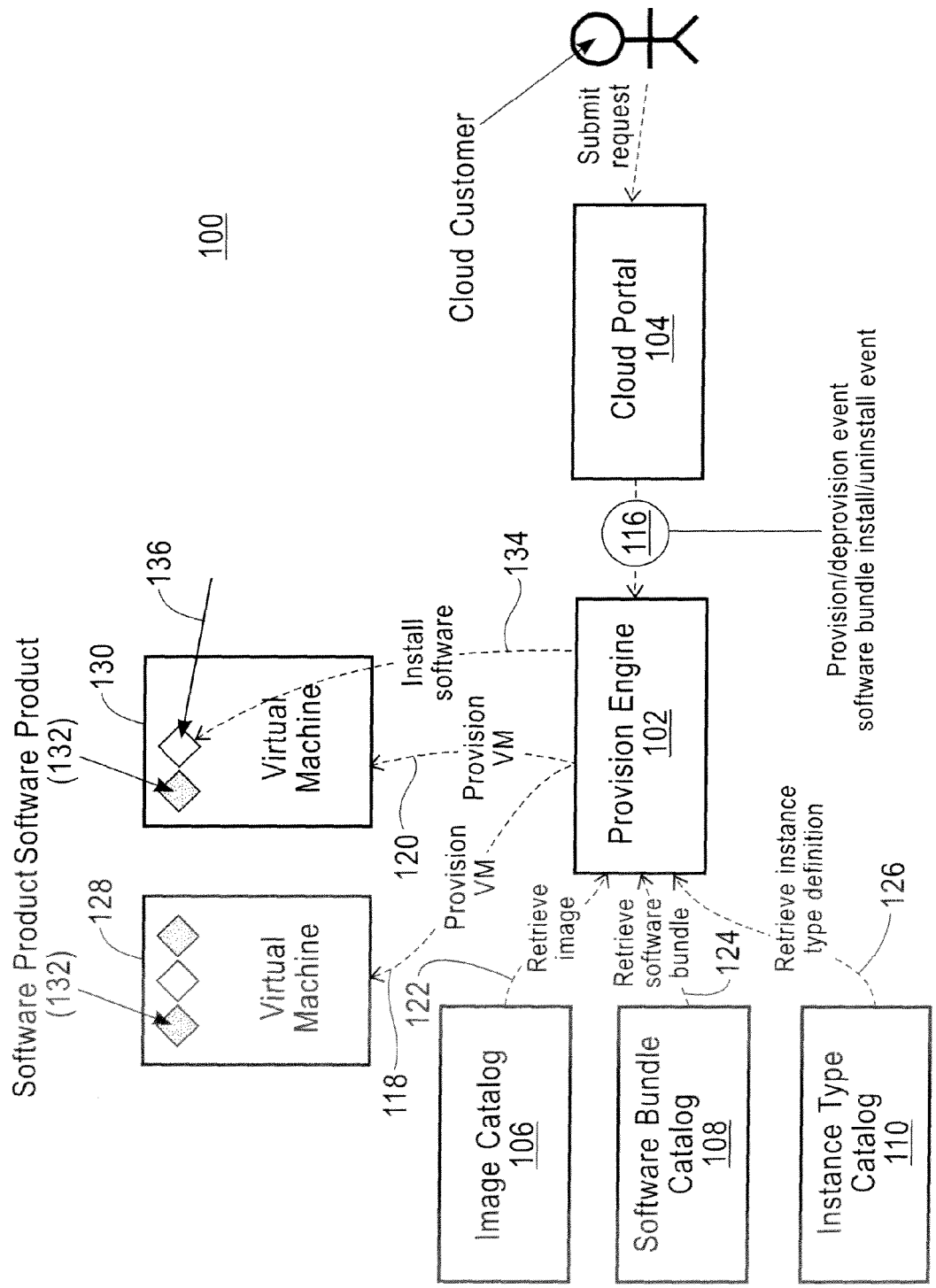
FIG. 1 illustrates a managed computing environment that may suitably employ license management mechanisms according to an embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present invention recognize that scans of computing environment suffer from a number of deficiencies. They interfere to some extent with the efficiency of a system in which they are used and are therefore carried out only periodically. Large modern computing environments are typically in a continual state of change and license management in such environments is subject to a number of difficulties. For example, server machines may be missed, software may be identified incorrectly, with incorrect server and client components being reported or with incorrect software editions being reported. Installation instances may be miscounted, with double counting, false positives, and false negatives occurring. Collection of license metric values may be incomplete.

In addition, scanning techniques face various challenges with respect to virtual machine instances. For example, scanning and reporting may outlast the lifetime of a virtual machine instance, or termination of a virtual machine instance may not be detected promptly. Scanning may require simultaneous access to domains that are isolated from one another, with, for example, information relating to software inventory being in a domain controlled by a customer and information relating to physical processor technology being in a domain controlled by a cloud provider. Software with different license types may not be differentiated in a virtual machine. Embodiments of the present invention recognize that these and other problems may be overcome by using information relating to managed systems, whose design includes the collection of information relating to changes to the computing environment.

Embodiments of the present invention recognize that large computing environments are generally known as "managed" environments, in which all changes to the organization's computing resources are performed through controlled processes, known as change-management processes. In a managed environment under change-management control, only authorized system personnel are able to perform such actions as software installation and removal. Users who desire software installation must submit a request, typically through an automated system. System personnel will receive the request, perform the service, and mark the request as complete. The present invention recognizes that in a managed environment, up to date information relating to the state of the computing resources of the system is available and is continually updated as changes are made. Analysis of this information can allow for accurate tracking of software instances and correlation with licenses.

Software instances are created through machine provisioning and software installation, which in a modern environment can be performed under automated control. Many organizations operate in what is known as a "cloud" environment, in which users are provided with the services and software they need, without any particular regard (from a user's perspective) to which physical hardware is providing the service. Many cloud environments regularly commission virtual machines with desired configurations as they are needed, and decommission them when they are no longer needed. Installation of software on a virtual machine creates a software instance for which a license should be obtained, and various other operations also require licenses.

The updating of computing services in a managed environment, as noted above, provides data identifying each step that is taken. Information that can be used to determine what licensing is required is collected as part of the managed environment operation. With respect to a virtual machine, such information includes characteristics of the virtual machine, software running on the machine, and even the uses to which the software is being put. For example, software manifests for image assets and software bundles are captured in topology files. Virtual machine provisioning and deprovisioning operations are tracked, with information collected on image asset identifier, start and end time, computer type, hypervisor identifier, and customer accounts. Deployment of software bundles on virtual machine instances may pass through a common application programming interface.

In one or more embodiments of the present invention, therefore, information generated in carrying out computing infrastructure management processes is gathered and processed to automatically discover license usage and support the license compliance process.

Determining the license obligations of a large enterprise may involve the analysis of hundreds of thousands of software instances, with the license required for a particular instance being determined by many factors, such as the machine on which the software is installed, other software of which the installed software may be a component, a contract under which the instance was purchase, and the purpose of the instance being used. Other considerations may include the software family of which the instance is a member, whether the instance is part of a bundle of applications licensed together, and similar considerations.

In management-based software operations, information relating to the context of software in the inventory of an enterprise is known. For example, such information includes information identifying bundle relationships, contracts, and operations served by the software. Embodiments of the present invention encode such information in structures accessed by management system workflows used to provision virtual machine images and install software and software bundles. Such techniques allow an accurate software inventory to be maintained at all times. If data is also maintained on the licenses held by an enterprise, licenses and their terms can be matched with software instances or with proposed creation or installation of software instances. In one or more embodiments of the invention, license management mechanisms are integrated with a computing services management system, and so has access to software image and software bundle catalogs and is able to determine what software is included in each image and bundle. License management mechanisms according to one or more embodiments of the invention also have access to information specifying the characteristics of each virtual machine and so are able to completely and accurately generate software inventory records.

FIG. 1 illustrates cloud environment 100, illustrating components of a computing services operation for which license management may be performed according to one or more embodiments of the present invention. The cloud environment 100 illustrates various components for maintaining software and provisioning virtual machines. The cloud environment 100 presented here comprises a provision engine 102 and a cloud portal 104, providing an interface to a user. The cloud environment 100 further comprises an image catalog 106 storing available software images, a software bundle catalog 108 storing information for software components packaged together and provided under a single license. The cloud environment 100 further comprises an instance type catalog 110, providing details relating to available configurations and usages of different software instances.

The presently illustrated example shows the provisioning of virtual machines and the installation of an additional software component on one of the virtual machines.

Upon a request from a user, submitted through the cloud portal 104, a computing management event 116 is configured. The event 116 may be a provision/deprovision event, a software bundle install/uninstall event, or other comparable event. Virtual machine provisioning events 118 and 120 are initiated to fulfill the request presented by the event 116. The provisioning events 118 and 120 call on an image retrieval event 122, a software bundle retrieval event 124, and an instance type retrieval event 126 to provide software components to be installed on virtual machines 128 and 130. The events 122, 124, and 126 furnish the provision engine 102. In the exemplary provisioning illustrated here, instances of a software product 132 are installed on the virtual machines 128 and 130. At a later time, the software product 134 is installed on the virtual machine 130. A software install event 136 calls on the needed information to be furnished to the provision engine 102 by means of events 122, 124, and 126.

The various transactions involving the service request, retrieval of images and information, and software installation involve information exchanges that can be used to understand the software changes being undertaken. This understanding of the software changes and to provide notice that the changes may affect or be affected by licensing requirements. In one or more embodiments of the invention, service requests and events performed in fulfilling the requested services are examined to determine that software license usage is or may be occurring, to allow for analysis of the service requests and events in terms of knowledge of the license inventory and terms and the identification of actions that should be taken based on the software changes and how they affect or are affected by the license inventory and requirements.

Mechanisms according to one or more embodiments of the invention, therefore, intercept software provisioning requests and collect information on which analysis may be performed to identify potential changes in license usage.

Figure 2:
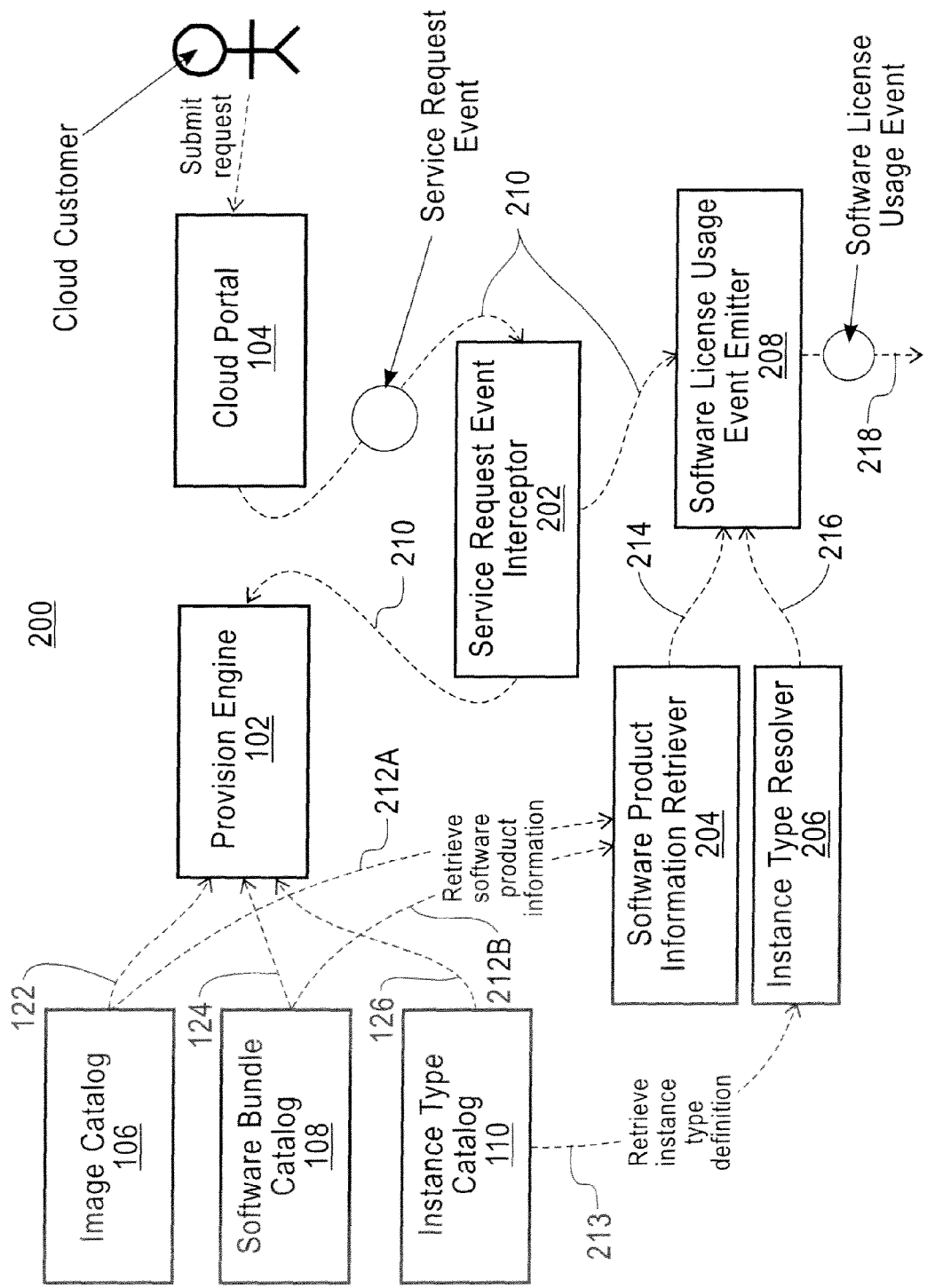
FIG. 2 illustrates a software usage analysis environment according to an embodiment of the present invention.

FIG. 2 illustrates a software usage analysis environment 200 which builds on the original managed system environment 100, but adds components and events to identify software usage and identify license usage events that need to be analyzed based on the existing license inventory.

To the environment 100, the software usage analysis environment 200 adds a service request event interceptor 202, a software product information retriever 204, an instance type resolver 206, and a software license usage event emitter 208. A service request from the cloud portal is intercepted as a service request event 210 which is captured by the service request event interceptor 202, a software product information retriever 204, an instance type resolver 206, and a software license usage event emitter 208. Information flows are software product information retrieval 212A from the image catalog 106 and 212B from the software bundle catalog 108, and an instance type definition retrieval 213 from the instance type catalog 110. The software product information retriever 214, instance type resolver 206, and service request event interceptor 202 provide information flows 210, 214, and 216 to the software license usage event emitter, which creates a software license usage event 218.

The software usage information and software license usage information generated by the analysis of the software usage information are in turn analyzed to generate information based on the software usage in terms of the organization's license inventory and terms.

Figure 3:
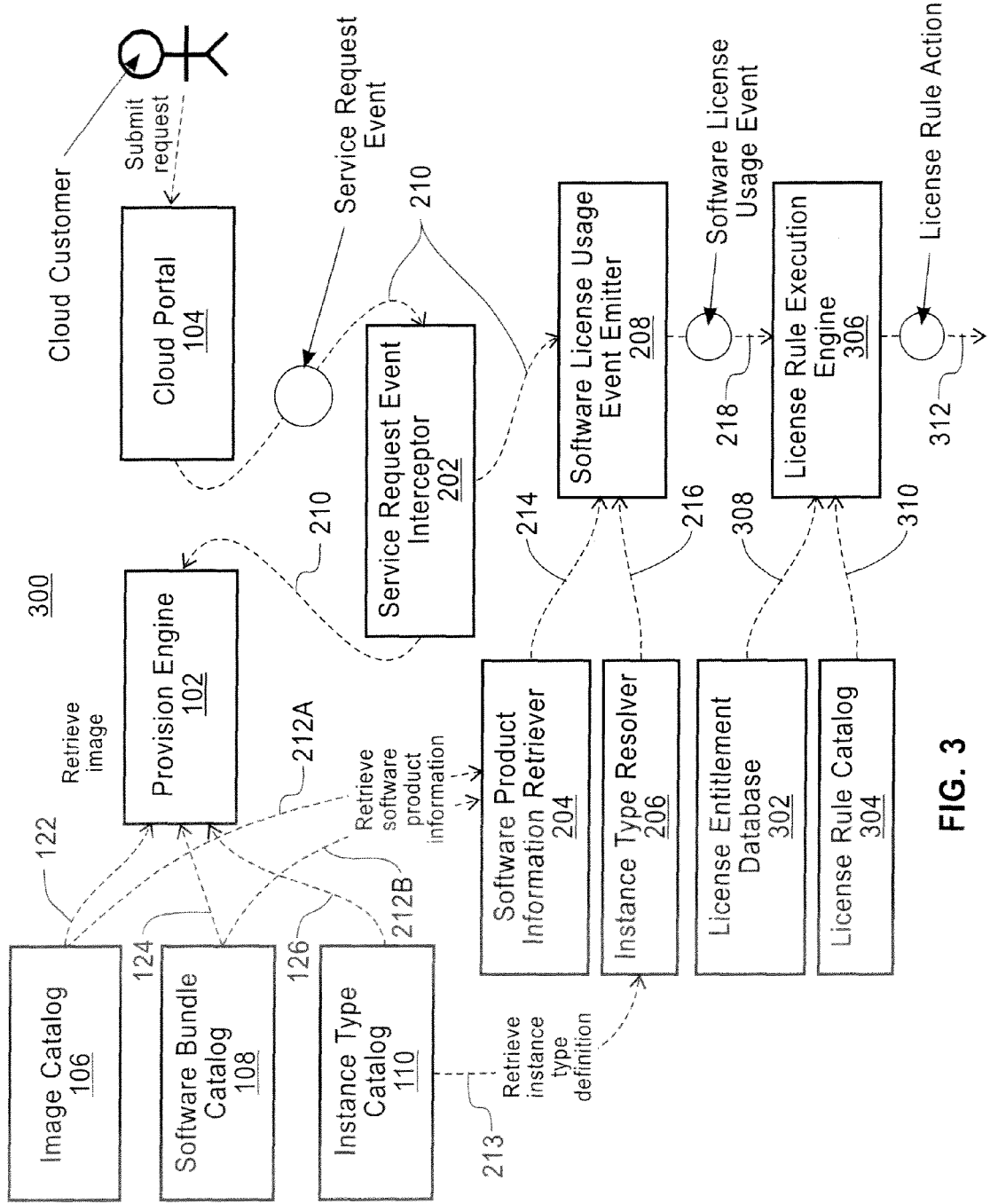
FIG. 3 illustrates a license analysis environment according to an embodiment of the present invention.

FIG. 3 therefore comprises a license analysis environment 300 according to one or more embodiments of the present invention, supplementing the software usage environment 200 with a license entitlement database 302, a license rule catalog 304, and a license rule execution engine 306. The license rule execution engine 306 receives the software license usage event 218 and information flows 308 and 310 from the license entitlement database 302 and the license rule catalog 310, to generate a license rule action 312. The license rule action 312 may be, for example, a report that an action is compliant or noncompliant or a decision to allow or prevent provisioning of a real or virtual machine or installation of a software component on a real or virtual machine.

Figure 4:
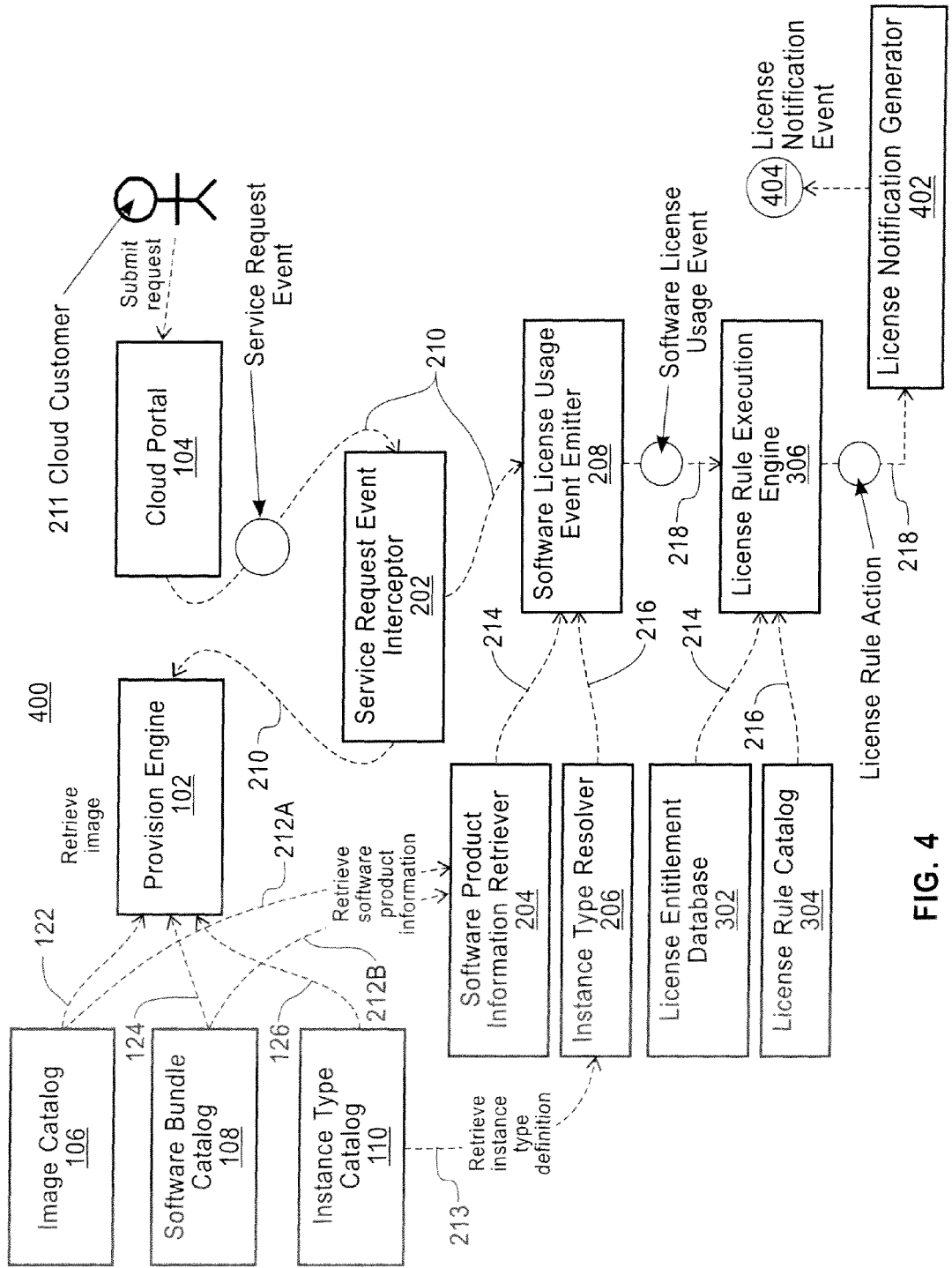
FIG. 4 illustrates a license notification environment according to an embodiment of the present invention.

FIG. 4 illustrates a license notification environment 400, which adds to the license analysis environment 300 a license notification generator 402, which produces a license notification event 404, which may, for example, comprise a report of the changes in software usage that have occurred or being proposed and the resulting change in license usage or requirements, such as a need for additional licenses, a compliance violation, or a reduction in license usage. A reduction in license usage may occur, for example, when a software component is uninstalled or when a virtual machine is deprovisioned.

Figure 5:
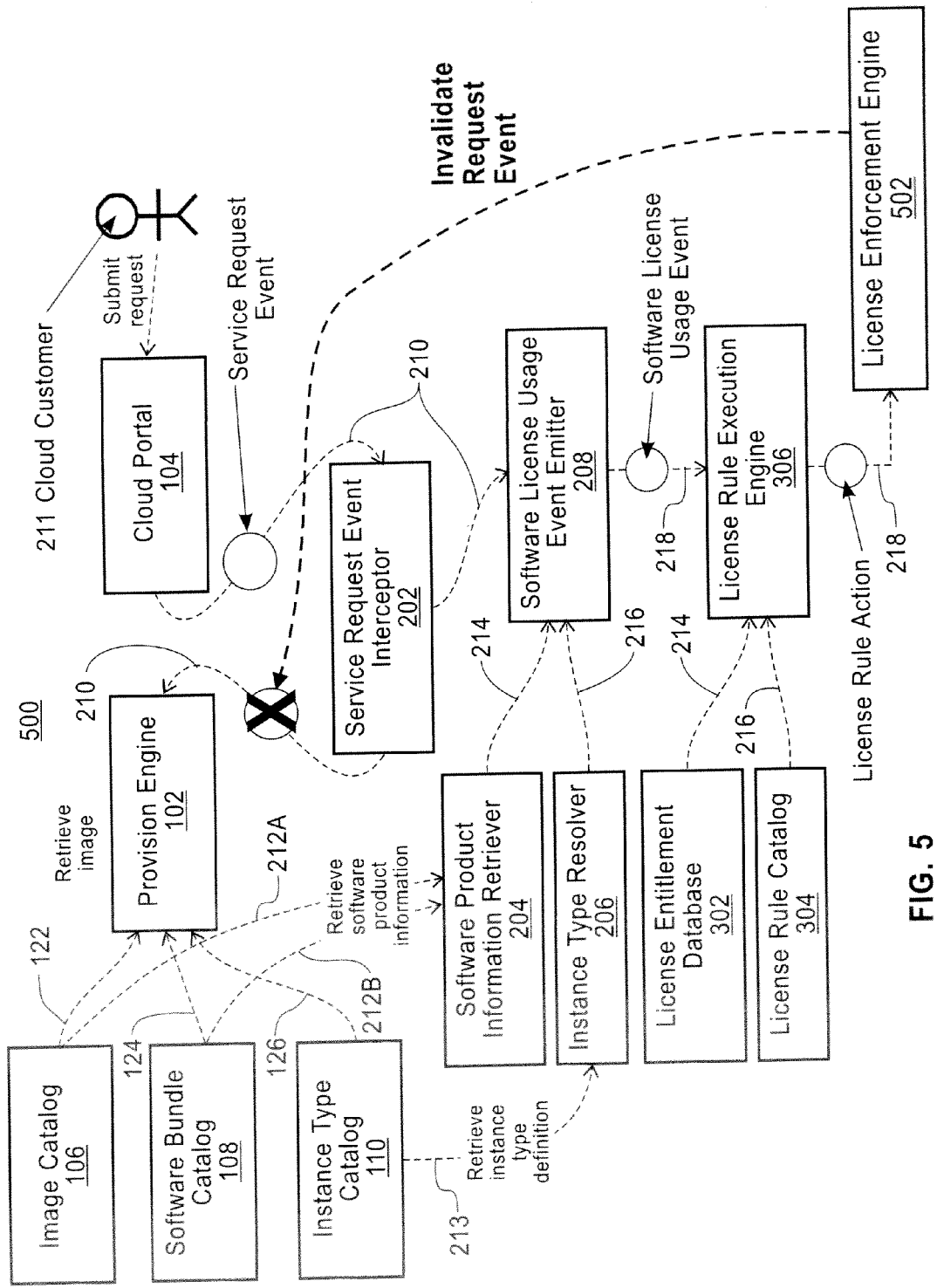
FIG. 5 illustrates a license enforcement environment according to an embodiment of the present invention.

One or more embodiments of the present invention may also perform license enforcement, preventing installation of software components that are not covered by a license held by the organization. FIG. 5 illustrates a license enforcement environment, adding to the license analysis environment 300 a license enforcement engine 502, which receives a license rule action 218 and prevents installation of a software component through, for example, an invalidate request event 504, which inhibits the passing of a service request 210 to the provision engine 102.

Figure 6:
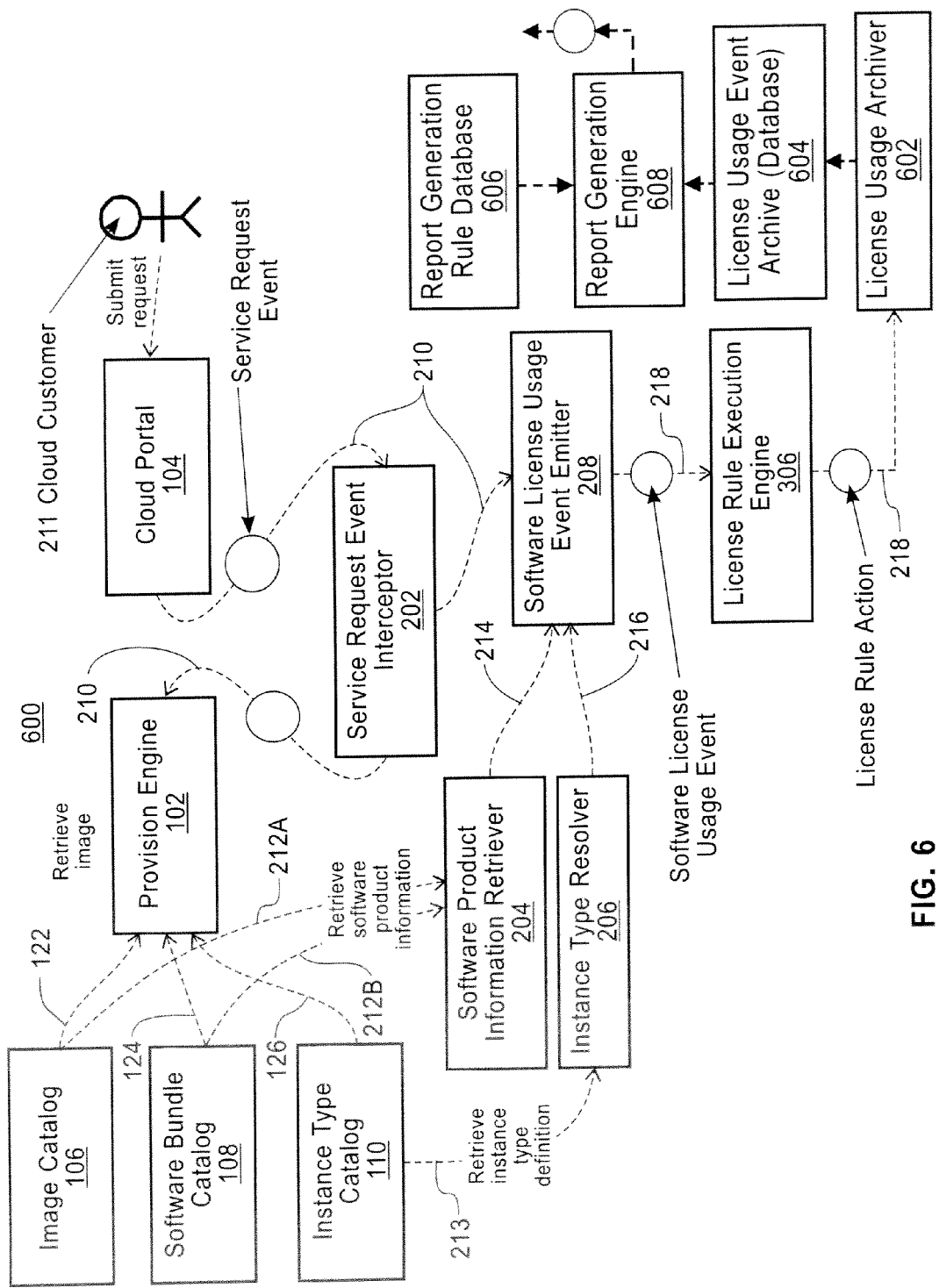
FIG. 6 illustrates a license analysis environment according to an embodiment of the present invention.

One or more embodiments of the present invention may also perform automatic license usage report generation. FIG. 6 illustrates a report generation and reporting environment 600, which supplements the software license analysis environment 300 with a license usage archiver 602, a license usage event archive 604, suitably implemented as a database 604, a report generation rule database 606, and a report generation engine 608. The report generation engine receives information from the license usage event archive 604 and is guided by the rules taken from the report generation rule database 606 to create a license usage report event 610, which generates reports, suitably periodically or upon the occurrence of a triggering event, such as an occurrence of noncompliance.

Figure 7:
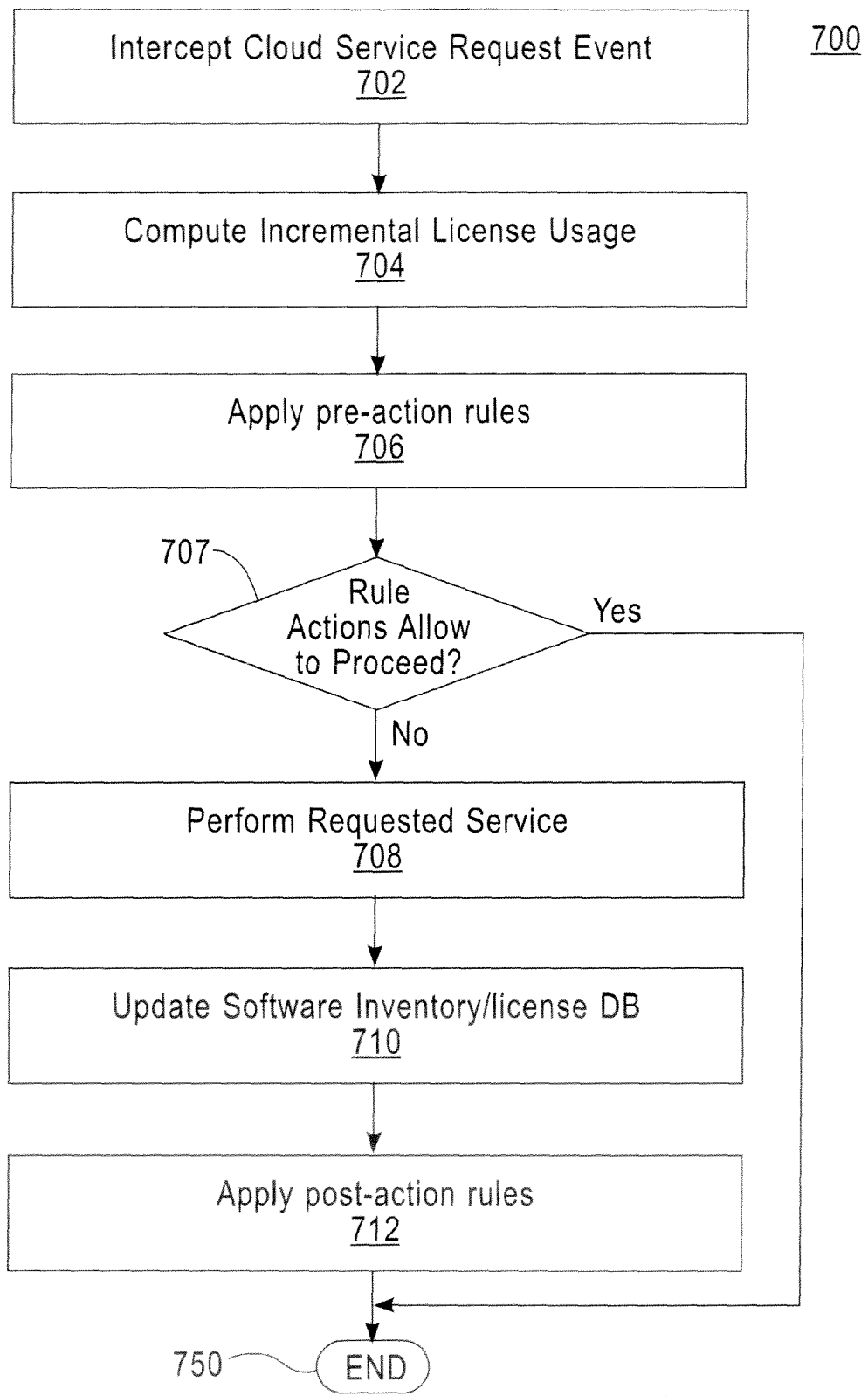
FIG. 7 illustrates a change management process according to an embodiment of the present invention.

FIG. 7 illustrates a process 700 according to an embodiment of the present invention. The process 700 provides an overall view of a change management process.

At step 702, a request, such as a cloud service request submitted through a cloud portal, is intercepted. At step 704, license usage is computed and at step 706, pre-action rules are applied. If the rules do not allow the action to proceed, the process skips to step 750 and finishes. If the rules do allow the actions to proceed, the process proceeds to step 708 and the requested service is performed. At step 710, software inventory and license information is updated. At step 712, post-action rules are performed and the process finishes at step 750.

Figure 8:
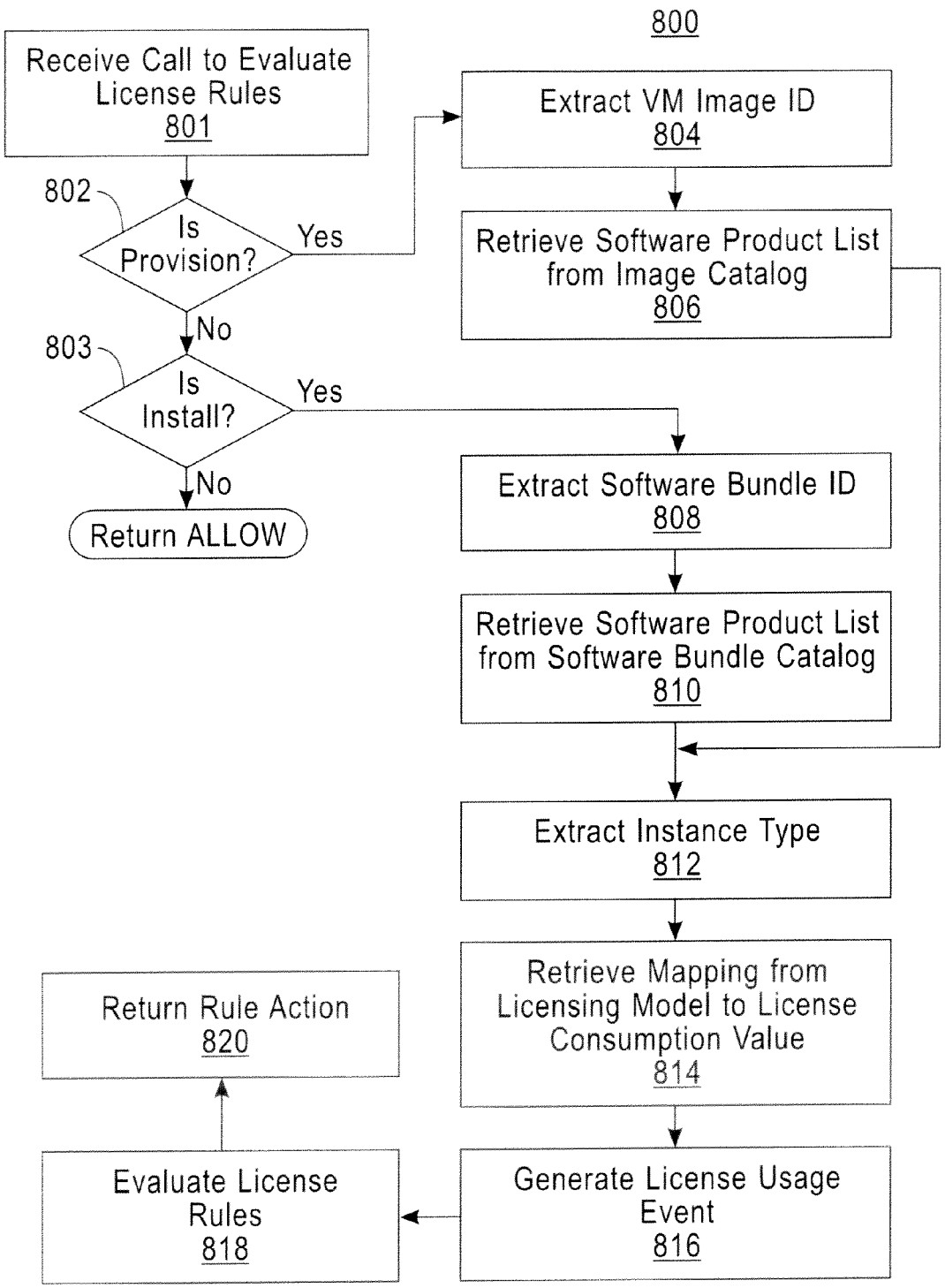
FIG. 8 illustrates a license management process according to an embodiment of the present invention.

FIG. 8 illustrates a process 800, showing steps undertaken in incremental license usage determination undertaken in a pre-change phase, before a change is made in response to a change request.

At step 802, a call is received to evaluate license rules and return a directed action based on the rules. If the evaluation is called for by neither a request to provision a virtual machine nor a request to perform an install, the process proceeds to step a request to provision a virtual machine, the process proceeds to step 850 and the action is allowed. If the evaluation is called for by a request to provision a virtual machine, the process proceeds to step 804 and a virtual machine image identifier is extracted. At step 806, a software product list is retrieved from a repository, such as an image catalog. Such an image catalog is typically maintained as part of a managed system. The process then skips to step 812.

If the evaluation is called not called for by a provisioning request, but is called for by a request to perform installation of a software bundle or a component that may belong to a software bundle, the process proceeds to step 808 and a software bundle identifier is extracted. At step 810, a software product list is retrieved from a software bundle catalog.

From step 812 forward, the process proceeds the same way in response to a provisioning request or an installation request. At step 812, an instance type is extracted. At step 814, mapping is retrieved that relates a licensing model to license consumption values. At step 816, a license usage event is generated by applying the identified software usage to the licensing model and using the mapping to determine the license consumption value. The license usage event identifies whether a change in license usage would result from the change request and the nature of the change, if any. At step 818, the license usage event is evaluated based on the license rules and at 820 a rule action is returned, directing a particular disposition of the change request in light of the license usage event.

Figure 9:
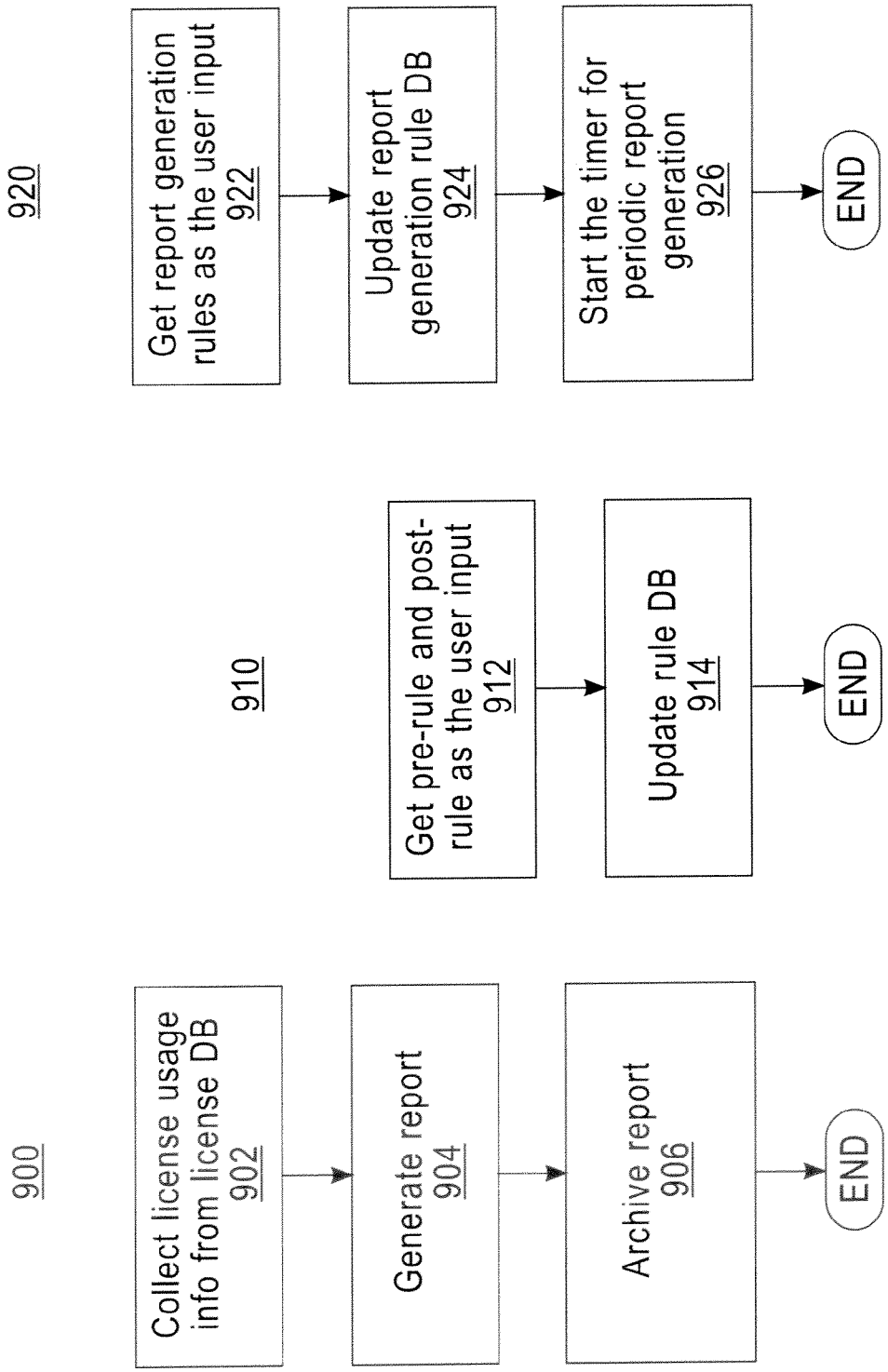
FIGS. 9A-9C illustrate processes of executing license rule actions according to an embodiment of the present invention.

FIGS. 9A-9C illustrate processes 900, 910, and 920, respectively, suitably carried out in connection with part of incremental license usage determination. FIG. 9A illustrates the process 900, providing for generating a license usage report. At step 902, license usage information is collected from a license database, at step 904 a report is generated, and at step 906, the report may be archived.

FIG. 9B illustrates the process 910, providing for updating rule information. At step 912, pre-rule and post-rule information may be received, suitably through user inputs, and at step 914, a rule database is updated.

FIG. 9C illustrate the process 920, providing for periodic report generation management. At step 922, report generation rule is received as an input. A report generation database is updated at step 924 and a timer is started for periodic report generation at step 926.

Figure 10:
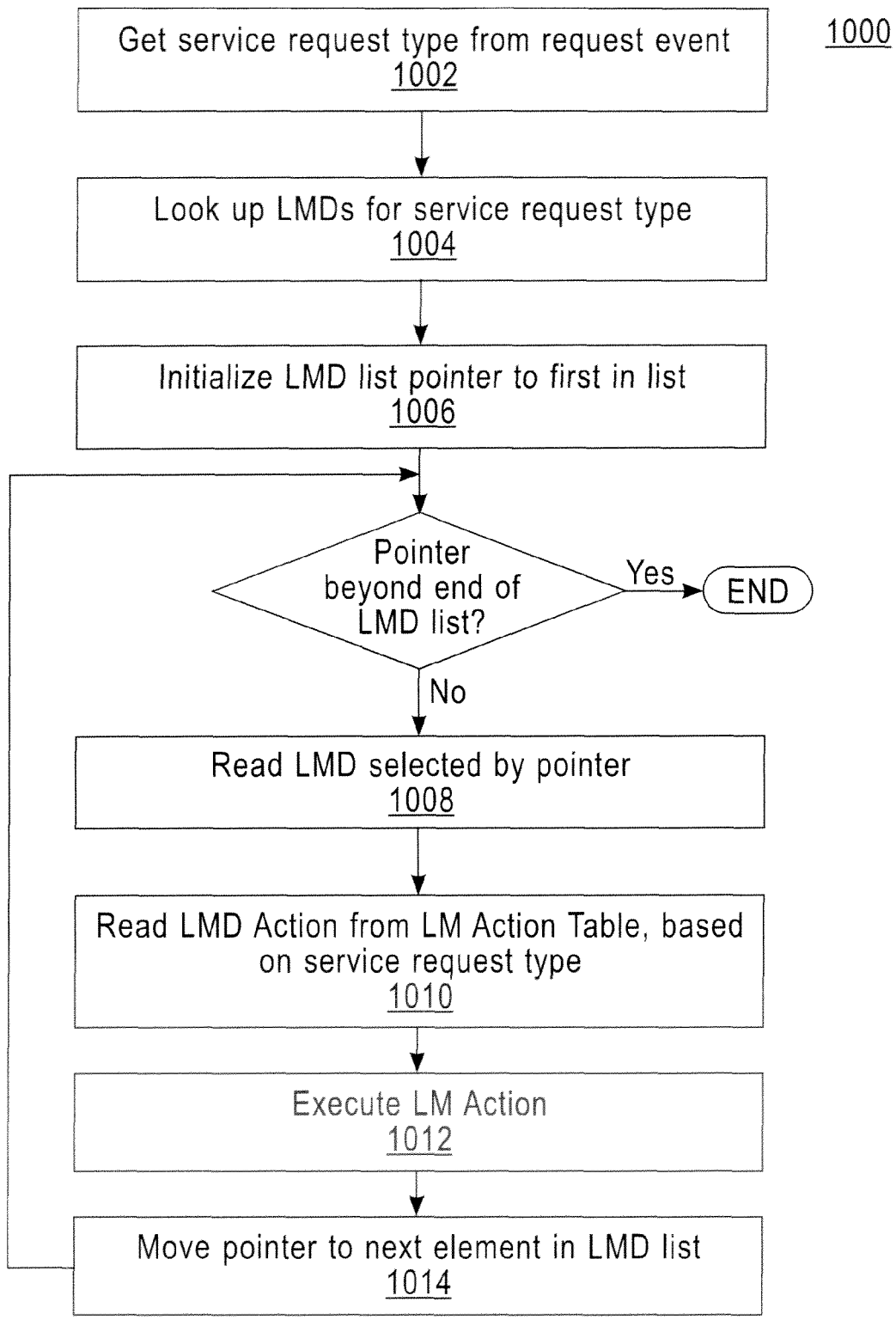
FIG. 10 illustrates a software inventory management process according to an embodiment of the present invention.

FIG. 10 illustrates a process 1000, providing for a software inventory update as part of a post-change phase. The process 1000 allows for arbitrary change-management actions that affect license obligations. Whereas in a basic cloud the operations are limited to software installation and uninstallation, a cloud serving the needs of a large enterprise will have more complex data-center operations. For example, there may be an operation to activate a backup server. This may have software-licensing implications, as software vendors may not charge licenses for software that is installed on machines only used as backups. When those machines are brought into production service, that software will incur license fees. To accommodate an arbitrary set of change-management services, one or more embodiments of the invention provide a mechanism that allows our management-based discovery service to be "programmed" to take actions according to the change-management service invoked. A License Management Descriptor (LMD) is a data structure that describes the action to take. The set of possible actions is:

Create a software activation record (SWAR), as upon installation or enablement of a particular software on a machine;

Update a SWAR (e.g., change an attribute that indicates its purpose from backup to production);

Mark a record as software-removed (when software is uninstalled).

A License Management Descriptor Table maps change-management actions to a sequence of LMDs. Multiple LMDs are required because a service request may involve multiple software changes (e.g., multiple products being installed), and a sequence is required because the changes may need to be applied in some order (e.g., an upgrade may require software removal followed by software installation).

At step 1002, a service request type is identified from a request event. At step 1004, LMDs for the service request type are identified and at step 1006, an LMD list pointer is updated to the first LMD in the list. If the pointer has passed the end of the list, the process stops at step 1050. If the pointer has not passed the end of the list, the process proceeds to step 1008 and the LMD selected by the pointer is read. At step 1010, a license management action is read suitably from a license management action table, based on a service request type and at step 1012, the license management action is executed. The action may, for example, be an insert software inventory record action, an update software inventory record action, or a delete software inventory record action. At step 1014, license reconciliation is performed and at step 1016, the pointer is moved to the next LMD in the LMD list. The process then returns to step 1018 for a determination of whether the pointer has passed the end of the LMD list.

Figure 11:
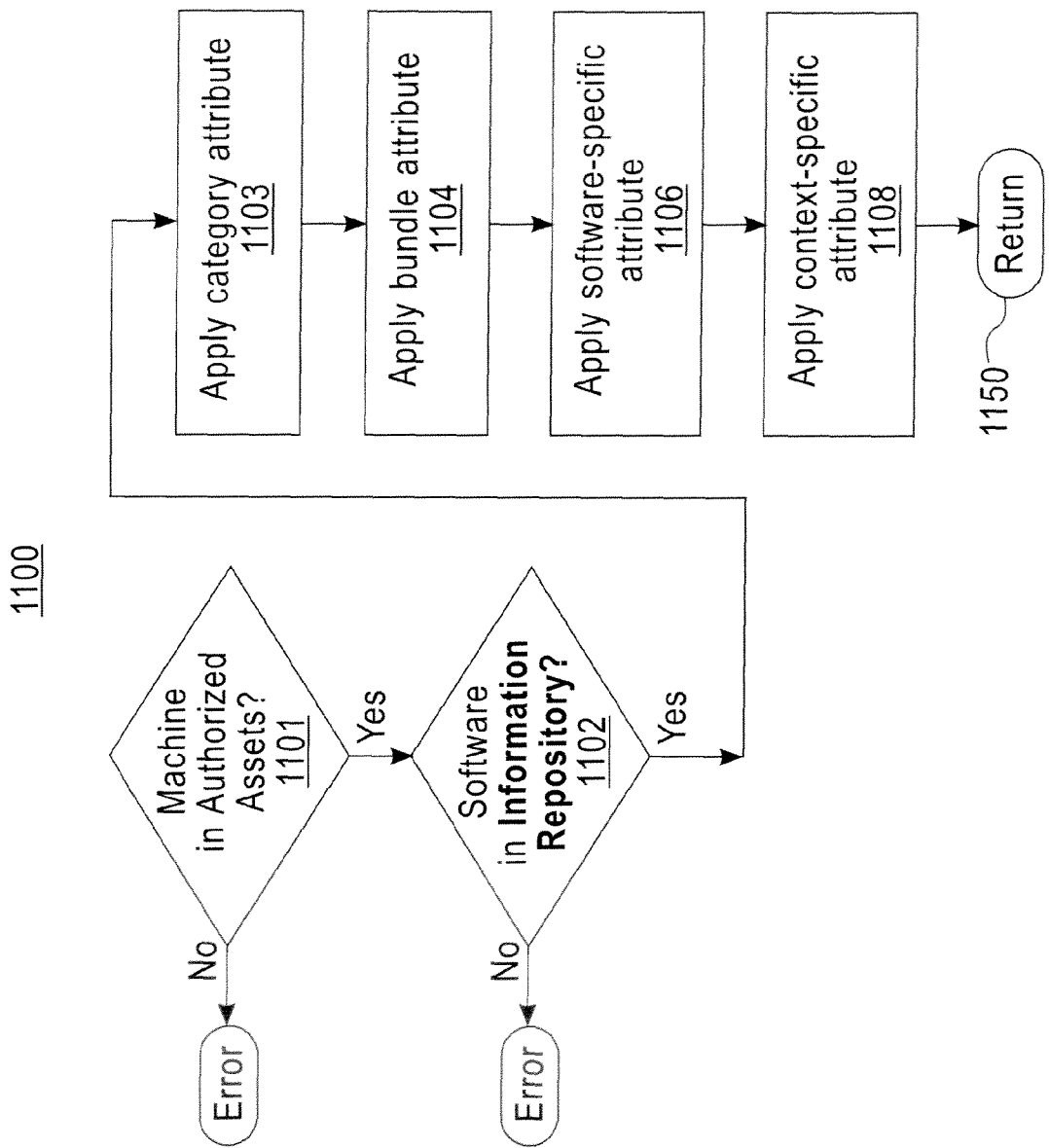
FIGS. 11-13 illustrate software inventory management actions according to embodiments of the present invention.

FIG. 11 illustrates a process 1100 presenting details of a software inventory record insert action, that is, insertion of a new software inventory record. A software inventory record contains attributes that are used in the license reconciliation phase. Two such attributes are "category" and "bundle." A category attribute identifies the instance as belonging to a class of software. License obligations are computed for the class rather than the specific title. An example is Microsoft Office. Any instances of Microsoft Word or Microsoft Excel would have their category attribute set to "MSOFFICE-2007". A bundle attribute of a software inventory record identifies another software inventory record that "covers" the license for the first record. Many IBM products contain other IBM products, which are not licensed separately. Finally, there are context-specific attributes such as "IsBackup" that would indicate that a software instance is not used in production but only as a backup.

At step 1101, a determination is made if the machine is among the authorized assets. If not, an error is returned. If the machine is among the authorized assets, the process proceeds to step 1102 and a determination is made if information identifying the software appears in a repository storing information describing members of a collection of software products, their components, and means to discover the members of the collection and their components. If not, an error is returned. If information identifying the software appears in the repository, the process proceeds to step 1103 and a category attribute is applied. The process proceeds to step 1104 and a bundle attribute is applied. The process then proceeds to step 1106 and a software specific attribute is applied. The process then proceeds to step 1108 and a context specific attribute is applied. The process returns at step 1150

Figure 12:
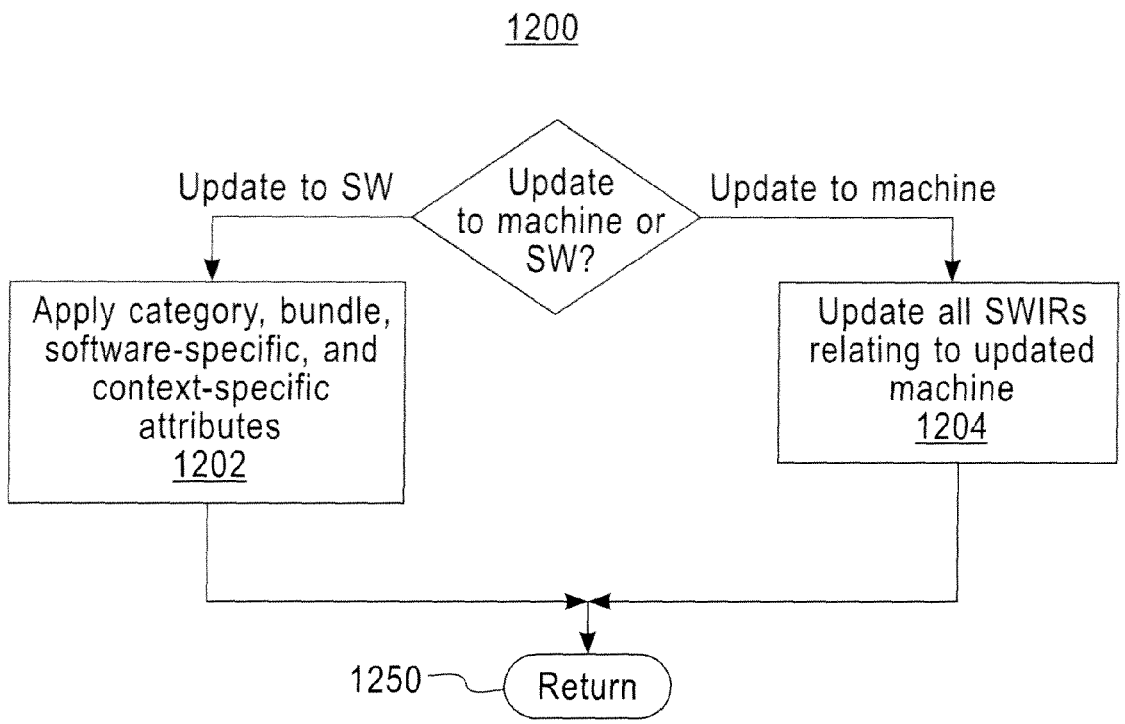

FIG. 12 illustrates a process 1200 of updating a software inventory record. At step 1201, a determination is made if a machine update is to be performed or if a software update is to be performed. If a software update is to be performed, the process proceeds to step 1202 and category, bundle, and context specific attributes are applied. The process returns at step 1250. If a machine update is to be performed, the process proceeds to step 1204 and all software inventory records relating to the machine are updated. The process returns at step 1250.

Figure 13:
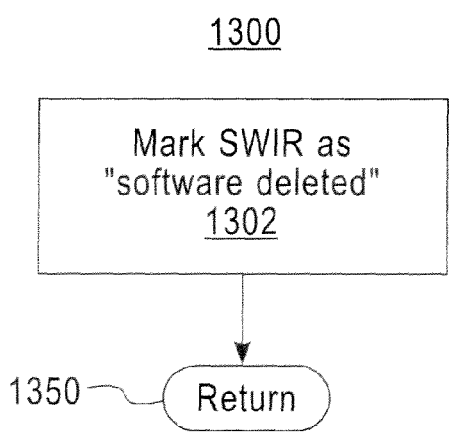

FIG. 13 illustrates a process 1300 of deleting a software inventory record. At step 1302, the software inventory record is marked as "software deleted" and the process returns at step 1350.

Figure 14:
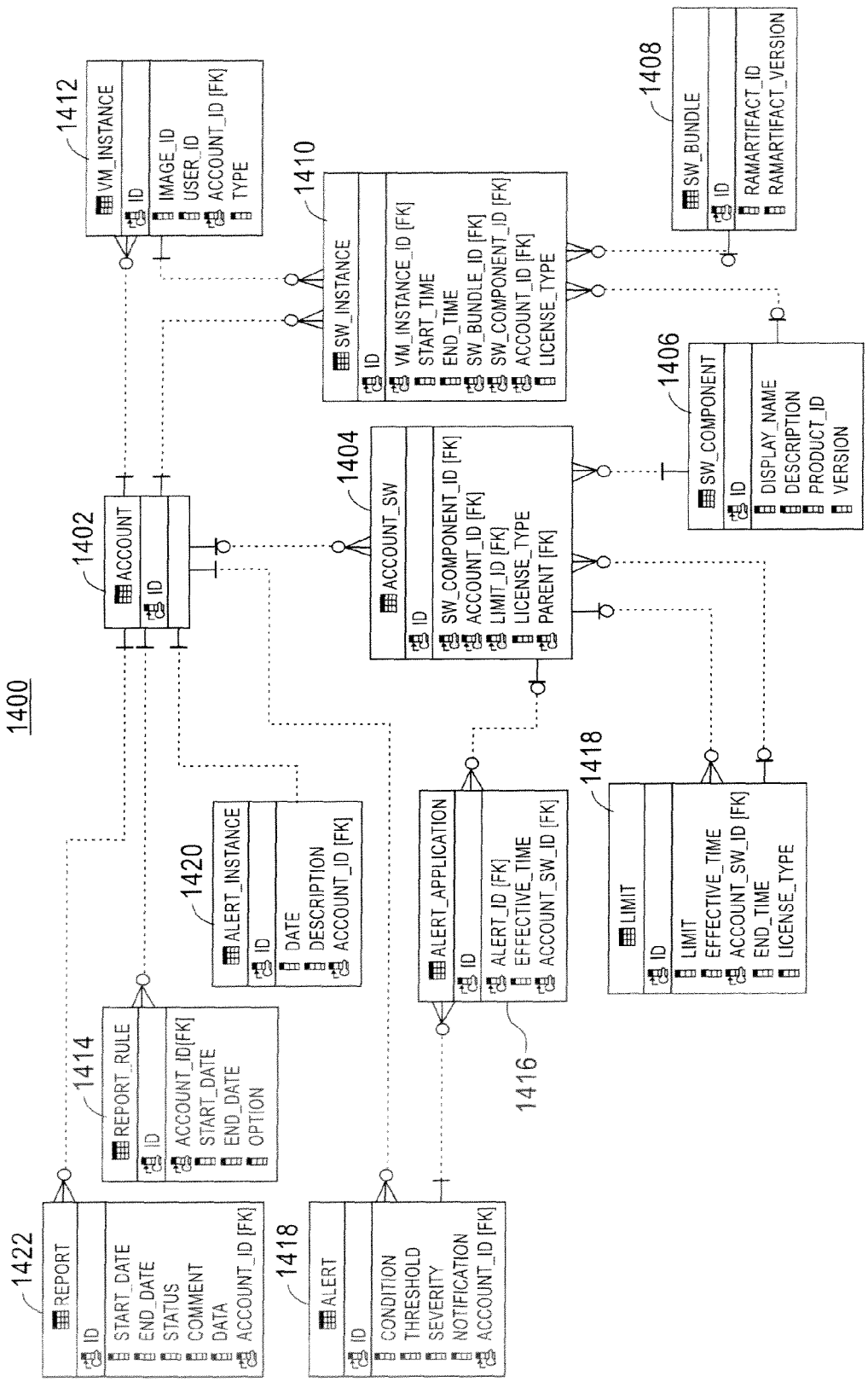
FIG. 14 illustrates a data model according to an embodiment of the present invention.

FIG. 14 illustrates a data model 1400 according to an embodiment of the present invention. The model 1400 is associated with user account information 1402, identified by a user identifier. A software inventory 1404 is associated with the account information 1402. The software inventory 1404 identifies software components 1406 and bundles 1408, as well as software instances 1410. One or more virtual machine instances 1412 is also associated with the account information 1402. The account information 1402 and the software inventory 1404 are also associated with information governing the assembly of information relating to software and license usage, such as reporting rules 1414, an alert application 1416, and limit information 1418. The reporting rules 1414 govern the conditions under which usage and licensing reporting is to be performed and the information to be included in reports, the alert application 1416 governs the organization and delivery of alerts—for example, an alert may be delivered for under-licensing or for over-licensing lasting more than a prescribed duration. Limits information 1418 relates to the various limitations on usage imposed by the licensing requirements of the software being used and on the organization's license inventory, and alerts, reports, and enforcement actions may be governed in part by the limits information.

The alert application 1416 defines alert characteristics 1418, which govern the generation of an alert instance 1420, and the reporting rules 1414 govern the generation of periodic and on-demand reports 1422.

Figure 15B:
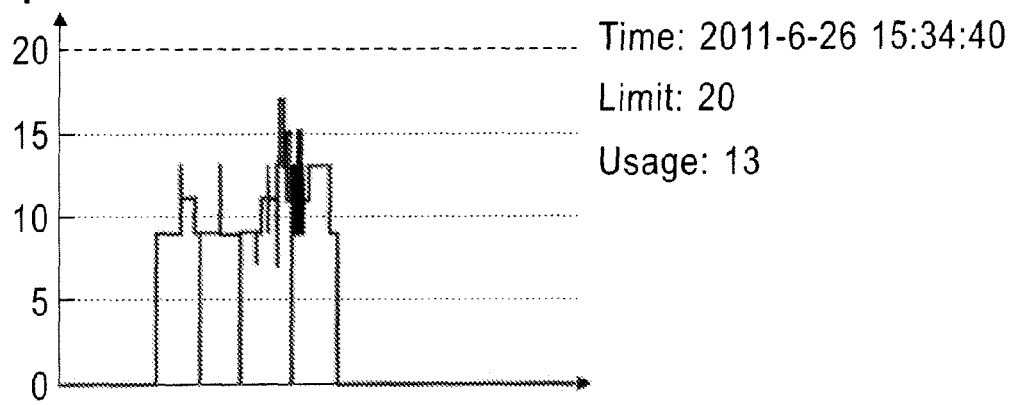

FIGS. 15A and 15B illustrate report views according to an embodiment of the present invention. The reports may be presented, for example, by a control interface that may be used to control the model 1400 of FIG. 14. FIG. 15A illustrates a detailed view 1500 relating to a single software product, showing each instance during a specified date range, the license type, an identifier for each software image, and provisioning and deprovisioning time. FIG. 15B illustrates a graphic display 1550 showing license usage as it varies over the specified time.

Figure 16:
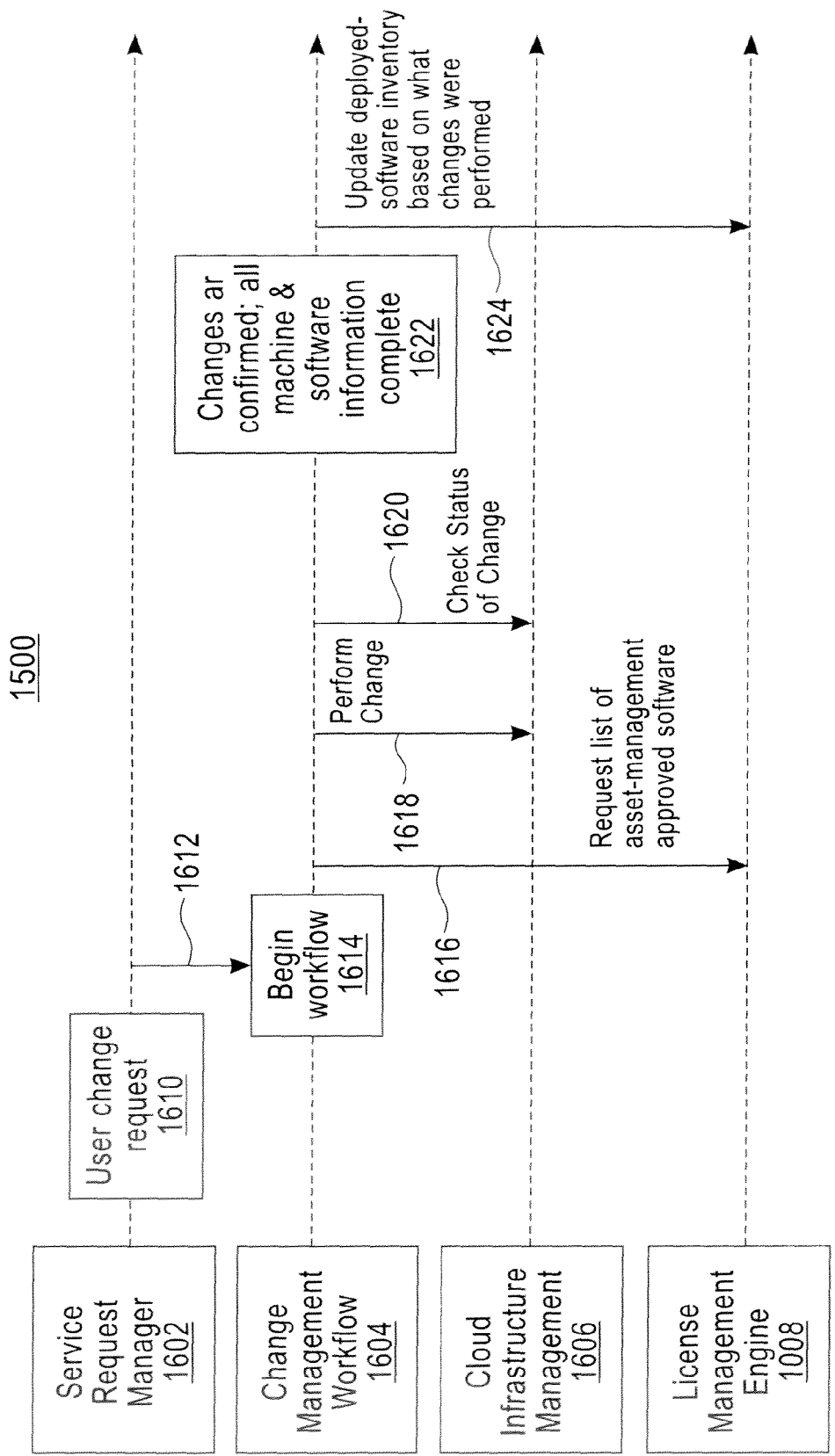
FIG. 16 illustrates workflows taking place in an embodiment of the present invention.

In one or more embodiments of the invention, workflows are coordinated between software management and license management. FIG. 16 illustrates information flows from software management operations, here represented as a service request manager 1002, change management workflow entity 1604, cloud infrastructure management entity 1006, and license management entity 1608. A user change request 1610 from the service request manager 1602 directs the change management entity 1604 to mark a workflow beginning 1614. In one or more embodiments of the invention, the change management entity 1602 issues a request 1616 for a list of asset-management approved software. In one or more other embodiments of the invention, no such request need be issued; instead, software changes may be made whether or not a particular software component appears on an approved list. After the list is requested, or in the absence of a request, the change management workflow entity 1604 issues a perform change request 1618 to the cloud infrastructure management entity 1606, followed by a check status of change request to the cloud infrastructure management entity 1620. The change management workflow entity 1604 performs a verification 1622 that changes are confirmed and all machine and software information is complete. The change management workflow entity 1604 then provides the license management engine 1608 with a request 1624 to update deployed software inventory based on what changes were performed, with the request including information describing the changes.

Figure 17:
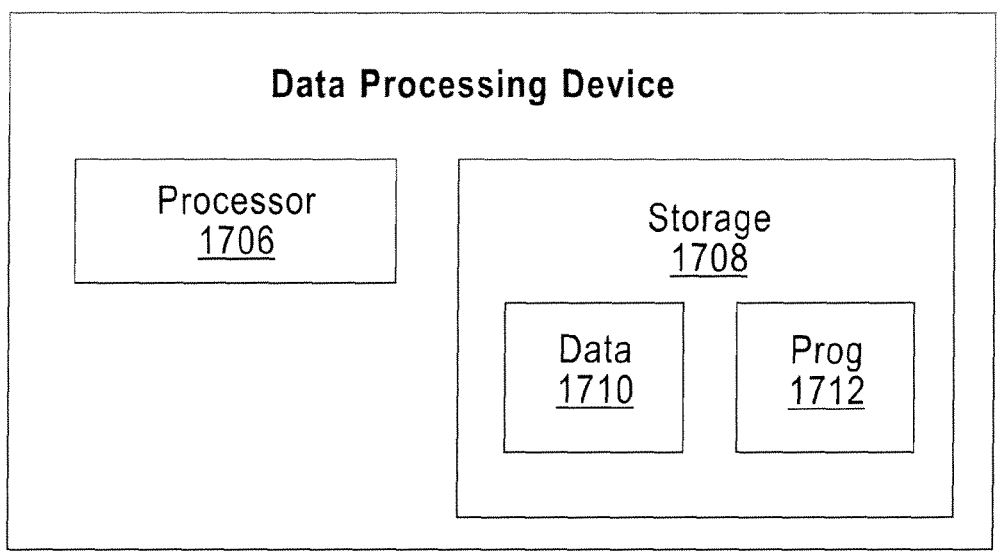
FIG. 17 illustrates elements that may be used to carry out an embodiment of the present invention.

Reference is now made to FIG. 17 for illustrating a simplified block diagram of details of an electronic device which may be implemented as a data processing device 1700. The data processing device 1700 may operate so as to record, receive, store, or process software usage, event, or license data or other information used in carrying out one or more embodiments of the present invention. Any number of devices such as the data processing device 1700 may be used, and may each may be configured as called for by the particular design of a system in which they may be used.

The data processing device 1700 includes a data processor (DP) 1706, and a memory (MEM) 1708 that stores data 1610 and one or more programs (PROGs) 1712.

At least one of the PROGs 1712 is assumed to include program instructions that, when executed by the associated DP, enable the electronic device to operate in accordance with the exemplary embodiments of this invention as was detailed above in detail.

In general, the exemplary embodiments of this invention may be implemented by computer software executable by the DP 1706, or by hardware, or by a combination of software and/or firmware and hardware. The interactions between the major logical elements should be obvious to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating between the various devices.

The MEM 1708 may be of any type suitable to the local technical environment and may be implemented using any suitable data storage technology, such as semiconductor based memory devices, magnetic memory devices and systems, optical memory devices and systems, fixed memory and removable memory. The DP 1706 may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the exemplary embodiments of this invention, as detailed by example above. As such, the exemplary embodiments of this invention may be implemented at least in part by computer software executable by the DP 1706 of the data processing device, or by hardware, or by a combination of software and hardware.

Various embodiments of the present invention take advantage of information that is routinely collected and updated in a managed system and examining that information to determine software usage and changes in software usage taking place in a computing system. Each request for a change in software usage may be used to determine its impact on license usage and also to determine if license usage should be reported or used as a basis for allowing or preventing fulfillment of the request.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

We claim:

1. A method comprising:
   intercepting a computing system service request;
   identifying at least one software usage change needed to fulfill the computing system service request, wherein identifying at least one software usage change comprises examining stored software information comprising instance type information, wherein the stored software information is updated as the computing system service request is fulfilled, wherein identifying the at least one software usage change comprises identifying at least one of provisioning and deprovisioning of a virtual machine, and wherein identifying the at least one of provisioning and deprovisioning of a virtual machine comprises identifying software installed on the virtual machine; and
   identifying at least one software license usage requirement resulting from the identified at least one software change, wherein identifying the at least one software license usage requirement comprises examining stored license information maintaining for each of a plurality of users a list of license entitlement records each comprising a record identifier, product name and version information, a licensing model, and an entitlement value.

2. The method of claim 1, wherein the stored software information comprises software bundle information.

3. The method of claim 1, wherein the instance type information comprises information defining at least one licensing requirement for at least one instance type.

4. The method of claim 1, wherein identifying the at least one software license requirement comprises using the at least one identified software change to map from a licensing model to a licensing consumption value.

5. The method of claim 1, wherein identifying the at least one software change comprises identifying a software product to be used by querying stored software product identification information using the computing system service request and identifying an incidence of license usage by using information relating to an identified software product to map from a licensing model to a licensing consumption value.

6. The method of claim 1, wherein identifying the at least one software license usage requirement comprises examining stored license information maintaining for each of a plurality of users a list of license entitlement records each comprising a record identifier, product name and version information, a licensing model, and an entitlement value.

7. A method comprising:
   intercepting a computing system service request;
   identifying at least one software usage change needed to fulfill the computing system service request;
   analyzing the resource usage state of a data processing system, wherein the state of the computing resources of the system is continually updated as changes are made;
   analyzing the resource usage state of a data processing system, wherein the state of the computing resources of the system is continually updated as changes are made;
   creating a software usage event based on analysis of at least one intercepted computing system service request, wherein the software usage event is created based at least in part on the analysis of the state of the computing resources of the system at the time of the request;
   identifying the at least one soft-ware license usage requirement comprises using the at least one identified software change to map from a licensing model to a licensing consumption value; and
   creating a software license usage event based on the software usage event, wherein the software license usage event is further based on stored license information and stored license rule information, wherein the stored license rule information comprises at least one rule governing an automated decision specifying whether or not to allow software usage based on the stored license information.

8. The method of claim 7, further comprising incrementing or decrementing license usage based on the software license usage event.

9. The method of claim 7, further comprising presenting a notification of software license usage indicated by the software license usage event.

10. The method of claim 7, further comprising controlling software usage based on whether or not the software license usage event indicates that the software usage indicated by the software usage event is covered by a valid license.

11. The method of claim 7, wherein the software usage event comprises at least one of a provisioning and a deprovisioning of a virtual machine.

12. The method of claim 11, wherein the software usage event comprises identifying at least one software component installed on a virtual machine.

13. The method of claim 7, wherein creating the software usage event comprises analysis of a software component being installed and wherein the analysis of the software component being installed is based at least in part on stored software information comprising software component identification, software bundle identification, and instance type identification.

14. A method comprising:
intercepting a computing system service request;
identifying at least one software usage change needed to fulfill the computing system service request, wherein identifying at least one software usage change comprises examining stored software information comprising instance type information, wherein the stored software information is updated as the computing system service request is fulfilled, wherein identifying the at least one software usage change comprises identifying at least one of provisioning and deprovisioning of a virtual machine, and wherein identifying the at least one of provisioning and deprovisioning of a virtual machine comprises identifying software installed on the virtual machine; and identifying at least one software license usage requirement resulting from the identified at least one software change, wherein:
identifying the at least one software license requirement comprises using the at least one identified software change to map from a licensing model to a licensing consumption value; or
wherein identifying at least one software change comprises identifying a software product to be used by querying stored software product identification information using the computing system service request and identifying an incidence of license usage by using information relating to an identified software product to map from a licensing model to a licensing consumption value; or
wherein identifying the at least one software license usage requirement comprises examining stored license information maintaining for each of a plurality of users a list of license entitlement records each comprising a record identifier, product name and version information, a licensing model, and an entitlement value.

15. The method of claim 14, wherein identifying the at least one software license requirement comprises examining stored license information and stored software license rule information and determining license usage based on the at least software usage change, the stored license information, and the stored license rule information.

16. The method of claim 14, wherein the stored license rule information comprises, for each of a plurality of users a list of license rules, each comprising a license entitlement record identifier, a condition predicated on an entitlement value defined by a license entitlement record associated with the identifier, and an action to be taken based on the condition.

17. The method of claim 14, determining license usage comprises identifying a software product and applying at least one applicable license rule based on the identification of the software product, evaluating a condition defined by the at least one applicable license rule, and executing an action associated with the condition if the condition is met.

* * * * *